United States Patent
Shi

(10) Patent No.: US 6,859,199 B2
(45) Date of Patent: Feb. 22, 2005

(54) METHOD AND APPARATUS FOR DETERMINING RELATIVE MOVEMENT IN AN OPTICAL MOUSE USING FEATURE EXTRACTION

(75) Inventor: Ge Shi, Santa Clara, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 166 days.

(21) Appl. No.: 10/011,912

(22) Filed: Nov. 6, 2001

(65) Prior Publication Data

US 2003/0085879 A1 May 8, 2003

(51) Int. Cl.[7] .................................................. G09G 5/08
(52) U.S. Cl. .................. 345/166; 345/156; 345/157; 345/158; 345/163; 382/107
(58) Field of Search ................................. 345/156–158, 345/162–163, 166; 382/107, 356

(56) References Cited

U.S. PATENT DOCUMENTS

| | | | |
|---|---|---|---|
| 5,644,139 A | | 7/1997 | Allen et al. |
| 5,786,804 A | | 7/1998 | Gordon |
| 5,940,538 A | * | 8/1999 | Spiegel et al. ............... 382/236 |
| 6,160,901 A | * | 12/2000 | Kage ........................... 382/107 |
| 6,172,354 B1 | * | 1/2001 | Adan et al. .................. 250/221 |
| 6,256,016 B1 | * | 7/2001 | Piot et al. .................... 345/166 |
| 6,281,882 B1 | | 8/2001 | Gordon et al. |

* cited by examiner

Primary Examiner—Henry N. Tran
Assistant Examiner—Peter Prizio
(74) Attorney, Agent, or Firm—Perkins Coie LLP

(57) ABSTRACT

A method of determining a movement vector between two images is disclosed. The method comprises capturing a first image using a sensor array. Next, a first feature set is extracted from the first image. A second image subsequent in time from the first image is captured. Similarly, a second feature set is extracted from the second image. The first feature set is compared to the second feature set to determine a shift in position of the second image relative to the first image. Finally, the movement vector is output based upon the shift in position.

6 Claims, 7 Drawing Sheets

|   |   |   |   |   |
|---|---|---|---|---|
| 0 | 15 | 37 | 41 | 56 |
| 9 | 12 | 91 | 30 | 43 |
| 9 | 19 | 24 | 48 | 57 |
| 4 | 5 | 18 | 87 | 71 |
| 10 | 20 | 35 | 9 | 11 |

|    |    |    |    |    |
|----|----|----|----|----|
| 34 | 12 | 19 | 21 | 17 |
| 85 | 75 | 37 | 41 | 49 |
| 20 | 8  | 23 | 56 | 82 |
| 8  | 16 | 27 | 9  | 0  |
| 99 | 87 | 54 | 56 | 59 |

FIGURE 7

|     |     |     |     |
|-----|-----|-----|-----|
| -12 | 7   | 2   | (-4) — 801 |
| -10 | -38 | (4) — 801 | 8 |
| 801 — (-12) | (15) | 33 | 26 |
| 8   | 11  | (-18) — 801 | -9 |
| -12 | -33 | (2) | 3 |

METHOD AND APPARATUS FOR DETERMINING RELATIVE MOVEMENT IN AN OPTICAL MOUSE USING FEATURE EXTRACTION

TECHNICAL FIELD OF THE INVENTION

The present invention relates generally to optical mice, and more particularly, to a method for determining movement of an optical mouse using feature extraction and with reduced calculation requirements.

BACKGROUND OF THE INVENTION

Various types of pointing devices are used as input devices that allow a user to manipulate a cursor of a computer. In laptop computers, a capacitive touch pad is commonly used to manipulate the cursor. For desktop computers, the ubiquitous computer mouse constitutes the large majority of pointing devices. The mouse allows for cursor manipulation on a visual display screen of a personal computer or workstation, for example. Cursor manipulation includes actions such as rapid relocation of a cursor from one area of the display screen to another area or selecting an object on a display screen.

In a prior art "roller ball" mouse, a user controls the cursor by moving the mouse over a surface, such as a mouse pad, so that the cursor moves on the display screen in a direction and a distance that is proportional to the movement of the mouse. The roller ball mouse, however, has drawbacks associated with many other devices that have mechanical parts. Namely, over time the mechanical components wear out, become dirty, or simply break down so that the cursor can no longer be accurately manipulated, if at all.

Recently, "optical" mice that use image sensors have been developed. For example, U.S. Pat. No. 6,281,882 describes an optical mouse that produces a collimated beam of light that illuminates a surface upon which the mouse rests. A sensor array portion of an image sensor receives the reflected images of the surface as the mouse is traversed across a surface. The changes in successive reflected images are then determined to be mouse movement, which is then interpreted as a desired cursor movement.

The '882 patent provides an excellent primer on optical mouse technology, detailing the physical construction of an optical mouse, the generation of interrogating light, the optical lens system for capturing the reflected light to form image frames, and the methods by which movement is determined. The present invention is concerned with the method by a "movement vector" is determined from the image frames. The term movement vector as used herein describes the magnitude and direction of the movement of the mouse. The movement vector, when provided to an associated computing device, can then be used to manipulate a cursor.

The '882 patent refers to several prior related patents, including U.S. Pat. No. 5,578,813, U.S. Pat. No. 5,644,139, and U.S. Pat. No. 5,786,804, which detail various methods the movement vector can be determined. In general, consecutive image frames are compared to one another to determine the relative motion of the mouse. The sensor array produces a two-dimensional image of the surface, the image being formed from discrete pixels. In the method described in the '139 patent, a first frame is stored. A second subsequent frame is then captured and stored. The second frame is compared to the first frame to determine the movement vector. Specifically, a correlation value is determined for each possible shift of the subsequent frame in the direction of each immediately neighboring pixel. For two-dimensional arrays, this corresponds to eight correlation calculations. Further, a correlation calculation is performed accounting for no shifting of the subsequent image. Thus, nine total correlation calculations are performed, relative to the first frame. The shift that results in the highest correlation provides the movement vector. Further detail on this technique can be found in the '139 patent.

However, because the correlation calculation is performed with a single pixel shift in each direction, the maximum speed by which the optical mouse can be moved (while still providing a usable signal) is limited. Specifically, the optical mouse cannot be moved translate more than one pixel distance between successively captured images without significant increase in the amount of correlation calculations. Thus, if the optical mouse is translated between one to two pixels between successive images, then 25 correlation calculations must be performed. If the optical mouse is translated between two to three pixels between successive images, 49 correlation calculations must be performed.

BRIEF DESCRIPTION OF THE DRAWINGS

In the drawings, like reference numerals refer to like parts throughout the various views of the non-limiting and non-exhaustive embodiments of the present invention, and wherein:

FIG. 4 is a schematic illustration of the sensor array of FIG. 3 capturing an image, with the image being represented as varying light intensities on individual pixels of the sensor array.

FIG. 7 is a schematic illustration of the sensor array of FIG. 3 capturing another image, with the image being represented as varying light intensities on individual pixels of the sensor array.

FIG. 8 is a schematic illustration of a feature extraction performed on the image of FIG. 7, showing an alternative class of features.

DETAILED DESCRIPTION OF THE ILLUSTRATED EMBODIMENTS

In the following description, numerous specific details are provided, such as the identification of various system components, to provide a thorough understanding of embodiments of the invention. One skilled in the art will recognize, however, that the invention can be practiced without one or more of the specific details, or with other methods, components, materials, etc. In still other instances, well-known structures, materials, or operations are not shown or described in detail to avoid obscuring aspects of various embodiments of the invention.

Reference throughout this specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
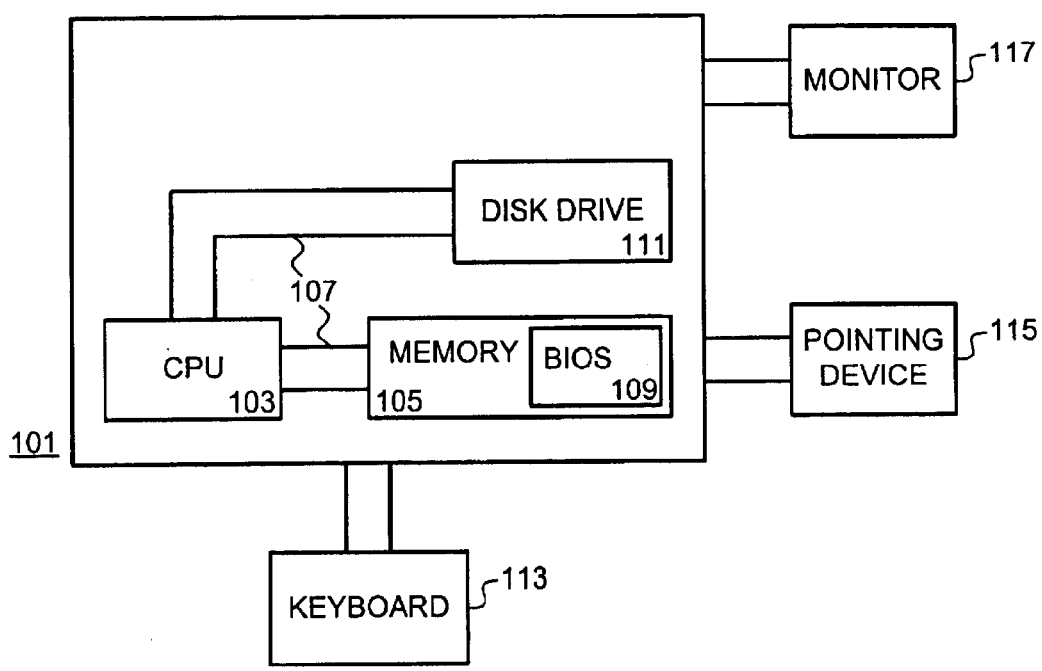
FIG. 1 is a schematic diagram of a prior art personal computer that incorporates a pointing device.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer or other computing device. Generally, program modules include routine programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like.

With reference to FIG. 1, an exemplary environment for the invention includes a general purpose computing device in the form of a conventional personal computer 101, which includes a processing unit 103, a system memory 105, and a system bus 107 that couples various system components including the system memory 105 to the processing unit 103. The system bus 107 may be any of several types of bus structures including a memory bus or memory controller, a peripheral bus, and a local bus using any of a variety of bus architectures. The system memory 105 may include read only memory (ROM), flash memory, or random access memory (RAM). A basic input/output 109 (BIOS), containing the basic routine that helps to transfer information between elements within the personal computer 101, such as during start-up, is stored in memory 105.

The personal computer 101 further includes a disk drive 111, such as a floppy disk drive or a CD disk drive. The disk drive 111 is connected to the system bus 107. The disk drive 111 and the associated computer-readable media provide nonvolatile storage of computer readable instructions, data structures, program modules and other data for the personal computer 101.

Although the exemplary environment described herein employs a disk drive 111, it should be appreciated by those skilled in the art that other types of computer readable media which can store data that is accessible by a computer, such as magnetic cassettes, flash memory cards, digital video disks, and the like, may also be used in the exemplary operating environment.

A number of program modules may be stored on the memory 105, including an operating system, one or more application programs, other program modules, and program data. A user may enter commands and information into the personal computer 101 through input devices such as a keyboard 113 and optical mouse 115. These and other input devices are often connected to the processing unit 103 through a serial port interface that is coupled to the system bus 107. A monitor 117 or other type of display device is also connected to the system bus 107 via an interface, such as a video adapter.

The personal computer 101 may operate in a networked environment using logic connections to one or more remote computers. The remote computer may be another personal computer, a server, a router, a network PC, a peer device or other network node, and typically includes many or all of the elements described above relative to the personal computer 101. Such networking environments are commonplace in offices, enterprise-wide computer network intranets and the Internet.

The optical mouse 115 may be substantially similar to that described in the '882 patent or U.S. Pat. No. 6,256,016 or U.S. Pat. No. 6,172,354. Indeed, the method and apparatus of the present invention (as implemented by an integrated circuit) may be incorporated into the structures found in the above patents. The distinction of the present invention over the prior art is the method by which the movement vector is determined. Whereas in the '139 patent, the movement vector is determined by shifting a subsequent frame in various directions and calculating a correlation (of every pixel in the image) to a previous frame and then determining the direction with highest correlation, as will be seen in greater detail below, the present invention uses feature extraction and comparison of feature movement between successive images.

Figure 2:
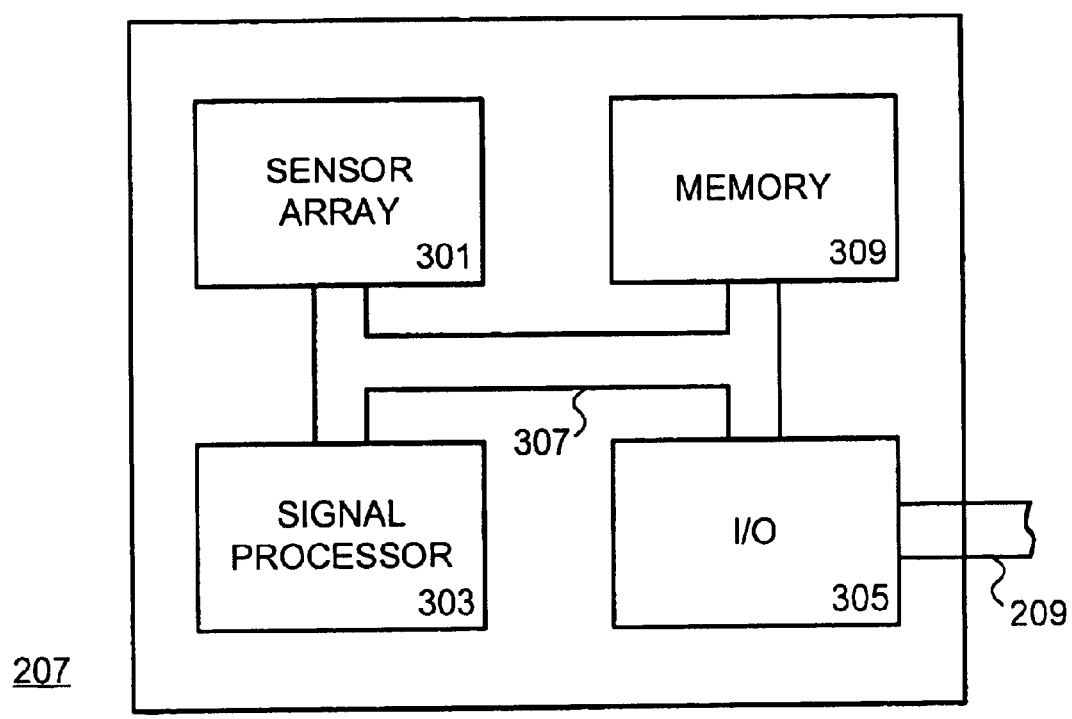
FIG. 2 is a schematic illustration of an integrated circuit suitable for use with the optical mouse of FIG. 1.

Turning to FIG. 2, an integrated circuit 207 formed in accordance with the present invention includes a sensor array 301, a signal processor 303, an input/output (I/O) 305, memory 309, and bus 307. The I/O 305 is connected via a cable 209 to the computer 101. Preferably, each of these components is formed on a single silicon substrate and manufactured to be integrated onto a single chip using standard CMOS processes.

The sensor array 301 may be, for example, substantially similar to the sensor arrays portions of image sensors manufactured by the assignee of the present invention, OmniVision Technologies, Inc., of Sunnyvale, Calif., as model numbers OV7630, OV7920, OV7930, OV9620, OV9630, OV6910, or OV 7640. However, typically the sensor array 301 of the present invention has a much lower resolution than model numbers above. Thus, instead of hundreds of thousands of pixels, the sensor array 301 may only include several hundred or a few thousand pixels. For example the sensor array 301 may be a 20×20 array.

Thus, the sensor array 301 includes a plurality of individual pixels arranged in a two-dimensional array. In operation, as the optical mouse is pointed at any arbitrary image, the image is focused onto the sensor array 301 by a lens system such that the sensor array 301 can obtain the raw image data.

The raw image data is then received by the signal processor 303 via bus 307 to begin signal processing. The signal processor 303 is capable of executing a set of preprogrammed instructions (perhaps stored in memory 309) necessary to carry out the functions of optical mouse. The design of the signal processor 303 may be obtained from any number of companies that provide embedded microprocessor or DSP cores, as applicable.

In the context of the presently illustrated embodiments, the signal processor 303 is programmed to obtain raw image data and store it with memory 309. In particular, in operation, the signal processor 303 stores a first image into memory 309. A second subsequent image is then also stored in memory 309. As further images are received, the images are stored in memory 309 in a first in first out (FIFO) fashion. The memory 309 should be large enough to store at least two successive images. In one embodiment, the sensor array may operate at a speed of 1500 frames per second, although slower or faster rates may be equally usable. Thus, two successive images are separated in time by about 0.67 milliseconds.

Once two successive images have been collected, the method of the present invention may be implemented by the signal processor (in conjunction with the memory 309) to determine a movement vector between the two images.

Thus, the signal processor 303, which may be a microprocessor or a digital signal processor ("DSP"), is used to calculate movement of the optical mouse 115 based upon successive images captured by the sensor array 301. Once the movement has been calculated, the signal processor 303 provides X and Y movement coordinates to I/O 305, which in turn provides the coordinates to computer 101. This information is then provided to the computer 101 via the I/O 305. The computer 101 can then utilize this information to manipulate a cursor on the monitor 117. In this manner, the optical mouse 115 of the present invention may be used to control a cursor.

Figure 3:
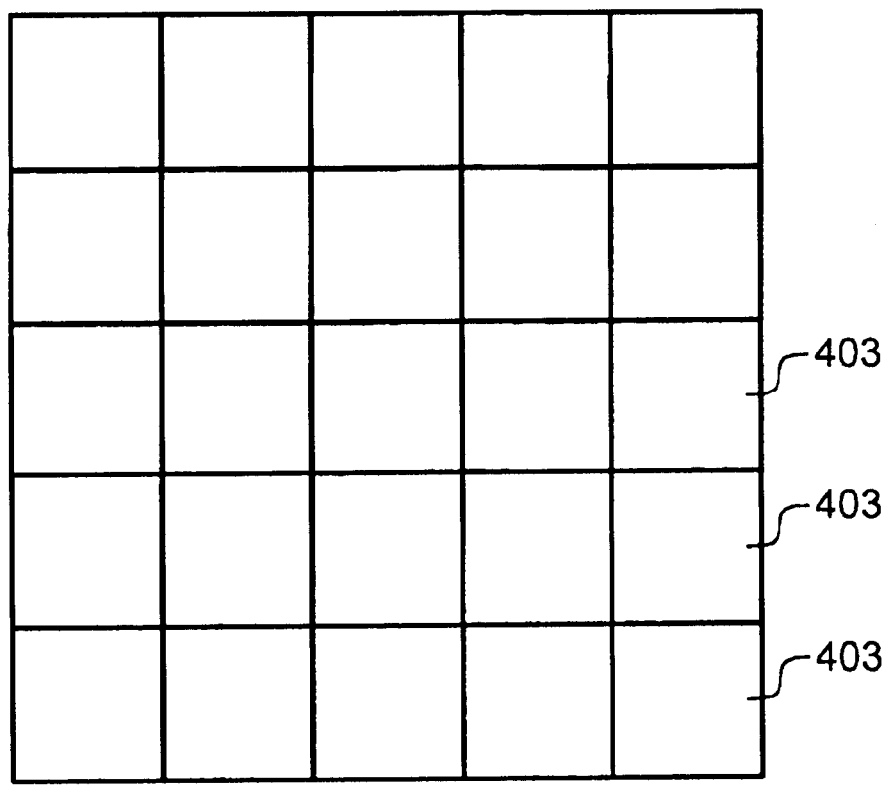
FIG. 3 is a schematic illustration of a two-dimensional sensor array.

As noted above, the present invention uses a feature extraction method to minimize the amount of calculations necessary by the processor 303. Turning to FIG. 3, a schematic illustration of a sensor array 401 is shown. The sensor array 401 in this example is a 5×5 array, comprising a total of 25 total pixels 403. It can be appreciated that the sensor array 401 may be of any arbitrary size that satisfactorily meets design requirements. However, for simplicity, a 5×5 array is used to describe the present invention. Each of the pixels 403 is designed to output a signal that is indicative as to the amount of radiation falling on that pixel. Thus, in order to form an image, such as of a surface upon which an optical mouse traverses, various pixels within the sensor array 401 will output various signals.

FIG. 4 shows an exemplar image with each pixel 403 having a number representing a magnitude of signal for that image. As an example, the magnitudes range from 0 to 100. The scale, range, and actual signal strength is not crucial to the present invention, but the example shown in FIG. 4 is only meant to aid in illustrating the present invention.

Thus, as seen in FIG. 4, various pixels have various signal strengths. In accordance with the present invention, a pixel gradient is calculated between each pixel 403 and a certain of its neighboring pixels. The pixel gradient is simply the difference in signal magnitude between the neighboring pixels. In one embodiment, the pixel gradient is measured between a pixel and its left and right neighboring pixels. It has been found that this is sufficient for generating enough features for purposes of the present invention. However, it can be appreciated that pixel gradients may be calculated for more neighboring pixels, up to a maximum of eight.

Figure 5:
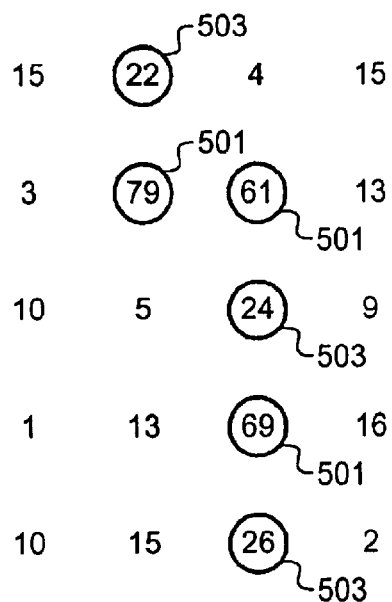
FIG. 5 is a schematic illustration of a feature extraction performed on the image of FIG. 4.

Turning to FIG. 5, the pixel gradients for the exemplar image of FIG. 4 is shown. As seen, in this embodiment, the resulting pixel gradient map is simply the difference in signal strength between adjacent pixels in the left and right directions. In the example shown in FIG. 5, both positive and negative gradients are shown, depending upon the difference between neighboring pixels. However, it can be appreciated that other mathematical measures of the gradient between adjacent pixels may be used. Thus, the description herein should not be construed as limiting and the term pixel gradient is understood to mean a measure of the variation between adjacent pixels.

In one embodiment, the calculation of the pixel gradient map is performed by storing the image data in memory 309, followed by performing arithmetic operations on the image data. The pixel gradient map is then also stored in memory 309. In an alternative embodiment, the pixel gradient map may be calculated using hardware subtraction circuits in real time, with only the pixel gradient map being stored in memory 309. In this manner, there is no need to store the image data.

Next, according to the present invention, features are extracted from the pixel gradient map. Features are defined as those pixel gradients that exceed a predetermined threshold. For example, if the predetermined threshold is a pixel gradient of fifty, then the pixel gradient map has three features 501. However, if the predetermined threshold is a pixel gradient of twenty, then the pixel gradient map has three additional features 503 in addition to features 501.

In one embodiment, the predetermined threshold is dynamic. In other words, the predetermined threshold will vary until a desired minimum number of features can be identified. It has been found that for a 20×20 array, it may be desirable to have approximately 20 features identified. Therefore, in operation, the predetermined threshold may have a first high value. The number of features that satisfy the threshold is then determined, and if there are insufficient features identified, then the predetermined threshold will be reduced a certain amount. This reduction of the predetermined threshold would continue until a requisite number of features can be identified.

Once this has been done, a feature set for a second subsequent image is determined. In the vast majority of cases, the second image will be related to the first image in some manner. First, the second image may be substantially identical to the first image. This corresponds to no movement of the sensor array 401 relative to the surface being imaged. Second, the second image may be shifted in an unknown direction from the first image. This corresponds to movement of the sensor array 401 relative to the surface being imaged.

Figure 6:
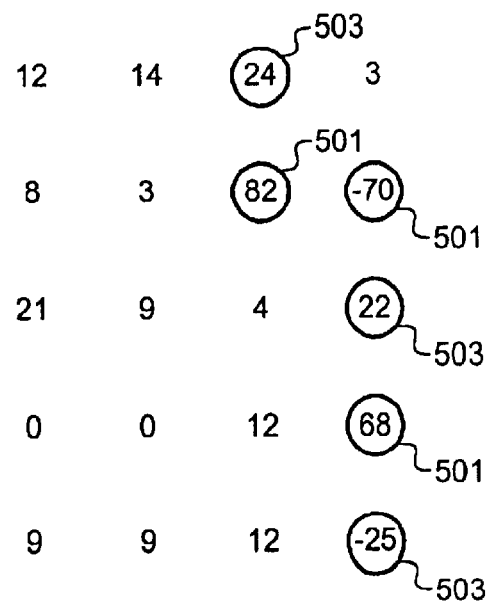
FIG. 6 is a schematic illustration of a feature extraction performed on a subsequent image relative to the image of FIG. 4.
Figure 9:
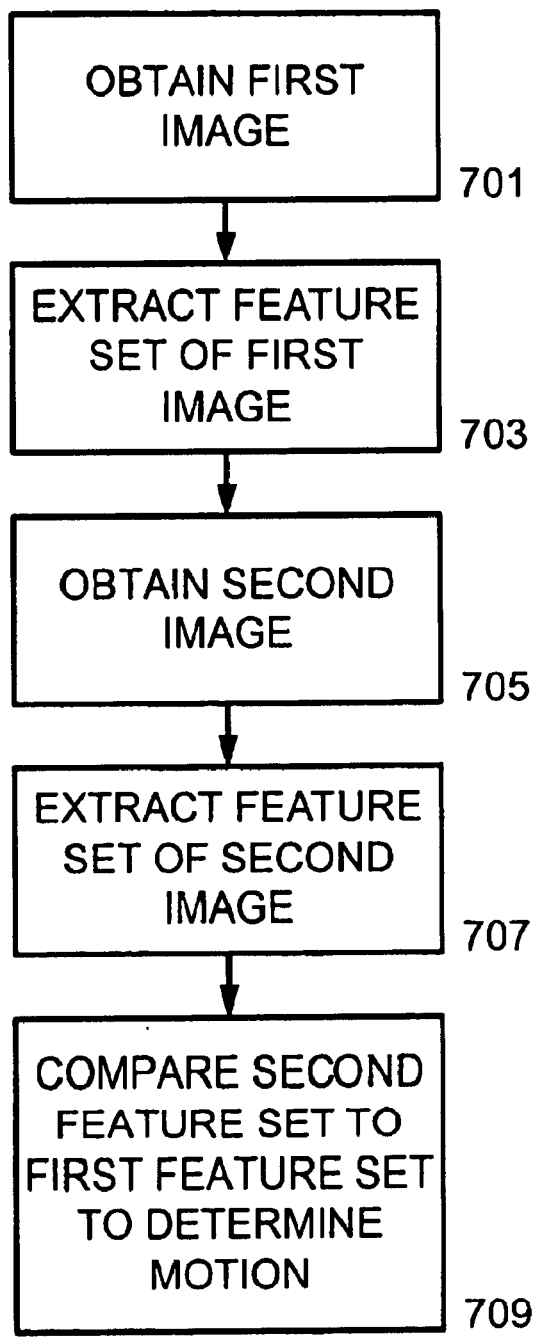
FIG. 9 is a flow diagram illustrating the process of the present invention.

Thus, turning to FIG. 6, an example of a pixel gradient map formed from a second subsequent image is shown. In this pixel gradient map, features 501 and 503 are also found. However, it is seen that the features have been shifted to the right one pixel. This indicates that the second image, relative to the first image, has been shifted to the left, thereby indicating that the optical mouse has also been traversed to the left. In this manner, the motion of the optical mouse can be determined by examining features extracted from sequential images obtained by the sensor array 401. Conventional methods are available for determining the direction of shift of features in sequential pixel gradient maps and will not be described in detail herein to avoid obscuring the present invention. Of course, it may often be the case that the feature set between frames has not shifted in any measurable amount between images. In such a case, this is interpreted as no movement of the optical mouse.

In an alternative embodiment, features may be based on different aspects of the pixel gradient map. For example, FIG. 7 shows another pixel map of an image formed on the sensor array 301. Like the previous embodiment, as seen in FIG. 8, a pixel gradient map is formed based upon the difference between adjacent neighboring pixels. However, in accordance with an alternative embodiment of the present invention, features may be defined to be those pixel gradients that show an "inflexion point". As seen in FIG. 8, five inflexion points 801 are indicated on the pixel gradient map. These inflexion points 801 indicate a change in the trend of the pixel map of FIG. 7. Looking at the fourth row of FIG. 7 as an example, the signal magnitude increase steadily from left to right, until between the third and fourth columns, where a decrease in signal strength from 27 to 9 is seen. This decrease in signal strength manifests in the pixel gradient map of FIG. 8 as an inflexion point 801. In short, inflexion points 801 are those areas of the pixel map where the signal magnitude changes its trend. These inflexion points 801 will occur when there is a change in sign in adjacent pixel gradients. It has been found that the use of such features may be advantageous in certain environments. In such an embodiment, the use of a threshold measurement may not be necessary.

It can be appreciated that the precise feature extraction methodology may be varied using different mathematical techniques. However, importantly, the feature extraction should be computationally easy in order to reduce the amount of processing needed.

A flow diagram showing the entire method of the present invention is shown in FIG. 7. First, at box 701, a first image is obtained by the sensor array of the underlying surface upon which the optical mouse rests. Next, at box 703, a feature set is extracted from the first image. Then, at box 705, a second image (subsequent in time to the first image) is obtained by the sensor array of the underlying surface upon which the optical mouse rests. Next, at box 707, a feature set is extracted from the second image. Then, at box 709, a comparison is made between the first feature set and the second feature set to determine the motion of the second image relative to the first image. This information is then output through I/O 305 and cable 209 to computer 101 for translation into the appropriate amount of cursor movement.

While the invention is described and illustrated here in the context of a limited number of embodiments, the invention may be embodied in many forms without departing from the spirit of the essential characteristics of the invention. The illustrated and described embodiments are therefore to be considered in all respects as illustrative and not restrictive. Thus, while the present invention has been described as useful in the optical mouse application, the present invention can be utilized in many different applications, including but not limited to, machine vision. The scope of the invention is indicated by the appended claims rather than by the foregoing description, and all changes which come within the meaning and range of equivalency of the claims are intended to be embraced therein.

What is claimed is:

1. A method of determining a movement vector of an optical mouse comprising:

capturing a first image comprised of a plurality of pixels;

extracting a first feature set from said first image, wherein the process of extracting said first feature set comprises:

(a) calculating a first pixel gradient map of said first image, said first pixel gradient map comprised of a plurality of first pixel gradients; and (b) determining which of said plurality of first pixel gradients exceed a predetermined threshold and identifying those first pixel gradients as features of said first feature set, wherein said first predetermined threshold is changed until a predetermined number of features is obtained;

capturing a second image subsequent in time from said first image, said second image comprised of a plurality of pixels;

extracting a second feature set from said second image, wherein the process of extracting said first feature set comprises;

(a) calculating a second pixel gradient map of said second image, said second pixel gradient map comprised of a plurality of second pixel gradients; and (b) determining which of said plurality of second pixel gradients exceed said predetermined threshold and identifying those second pixel gradients as features of said second feature set;

comparing said first feature set to said second feature set to determine a shift in position of said second image relative to said first image; and outputting said movement vector based upon said shift in position.

2. The method of claim 1 wherein said first image and second image are captured by an image sensor incorporated into an optical mouse.

3. The method of claim 1 wherein said first pixel gradients is the difference in signal strength between adjacent pixels of said first image.

4. An optical mouse comprising:

a sensor array for capturing a first image and a second image, said first image comprised of a plurality of pixels and said second image comprised of a plurality of pixels;

means for extracting a first feature set from said first image, wherein said means for extracting said first feature set comprises:

(a) means for calculating a first pixel gradient map of said first image, said first pixel gradient map comprised of a plurality of first pixel gradients; and (b) means for determining which of said plurality of first pixel gradients exceed a predetermined threshold and identifying those first pixel gradients as features of said first feature set, wherein said predetermined threshold is changed until a predetermined number of features is obtained;

means for extracting a second feature set from said second image, wherein said means for extracting said second feature set comprises:

(a) means for calculating a second pixel gradient map of said second image, said second pixel gradient map comprised of a plurality of second pixel gradients; and (a) means for determining which of said plurality of second pixel gradients exceed said predetermined threshold and identifying those second pixel gradients as features of said second feature set;

means for comparing said first feature set to said second feature set to determine a shift in position of said second image relative to said first image; and means outputting a movement vector based upon said shift in position.

5. The mouse of claim 4 wherein said sensor is a two-dimensional array of pixels.

6. The mouse of claim 4 wherein said first pixel gradients is the difference in signal strength between adjacent pixels of said first image.

* * * * *